(12) United States Patent
Si et al.

(10) Patent No.: US 12,348,441 B2
(45) Date of Patent: Jul. 1, 2025

(54) METHOD FOR CONFIGURING POSITIONING REFERENCE SIGNAL IN NR SYSTEM, METHOD FOR RECEIVING POSITIONING REFERENCE SIGNAL IN NR SYSTEM, AND DEVICE

(71) Applicant: VIVO MOBILE COMMUNICATION CO., LTD., Guangdong (CN)

(72) Inventors: Ye Si, Chang'an Dongguan (CN); Peng Sun, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 778 days.

(21) Appl. No.: 17/111,028

(22) Filed: Dec. 3, 2020

(65) Prior Publication Data
US 2021/0091905 A1    Mar. 25, 2021

Related U.S. Application Data

(63) Continuation of application No. PCT/CN2019/091865, filed on Jun. 19, 2019.

(30) Foreign Application Priority Data

Jun. 22, 2018  (CN) .......................... 201810651385.6

(51) Int. Cl.
*H04W 4/029* (2018.01)
*G01S 5/02* (2010.01)
*H04L 5/00* (2006.01)

(52) U.S. Cl.
CPC .......... *H04L 5/0048* (2013.01); *G01S 5/0295* (2020.05); *H04W 4/029* (2018.02)

(58) Field of Classification Search
CPC ...... H04W 4/029; H04W 64/00; H04W 72/04
USPC ........ 370/329, 506, 328, 252, 330, 311, 318
See application file for complete search history.

(56) References Cited

U.S. PATENT DOCUMENTS

| | | | |
|---|---|---|---|
| 9,386,469 B2 * | 7/2016 | Siomina | H04W 24/08 |
| 11,398,874 B2 * | 7/2022 | Yoon | H04W 56/00 |
| 2012/0108270 A1 * | 5/2012 | Kazmi | H04W 36/0061 |
| | | | 455/456.5 |
| 2014/0200016 A1 * | 7/2014 | Siomina | H04W 28/20 |
| | | | 455/450 |

(Continued)

FOREIGN PATENT DOCUMENTS

| | | |
|---|---|---|
| CN | 105472528 A | 4/2016 |
| CN | 107690787 A | 2/2018 |

(Continued)

OTHER PUBLICATIONS

Japanese Office Action from corresponding JP Application No. 2020-571639, Feb. 8, 2022.

(Continued)

*Primary Examiner* — Joseph Arevalo
(74) *Attorney, Agent, or Firm* — BROOKS KUSHMAN P.C.

(57) ABSTRACT

This disclosure provides a method for configuring a positioning reference signal in an NR system, a method for receiving a positioning reference signal in an NR system, and a device. The configuration method includes: transmitting first target configuration information, where the first target configuration information is used to configure a positioning reference signal PRS of a terminal device.

16 Claims, 7 Drawing Sheets

(56) References Cited

U.S. PATENT DOCUMENTS

| | | | |
|---|---|---|---|
| 2015/0018010 A1 | 1/2015 | Fischer | |
| 2015/0153395 A1* | 6/2015 | Siomina | H04B 17/309 |
| | | | 324/76.39 |
| 2015/0208262 A1* | 7/2015 | Siomina | H04W 24/10 |
| | | | 370/252 |
| 2015/0382318 A1 | 12/2015 | Kim et al. | |
| 2016/0205499 A1* | 7/2016 | Davydov | G01S 5/0236 |
| | | | 455/456.1 |
| 2017/0201960 A1 | 7/2017 | Park et al. | |
| 2017/0230977 A1 | 8/2017 | Shen et al. | |
| 2018/0011163 A1* | 1/2018 | Han | G01S 5/0236 |
| 2018/0024225 A1 | 1/2018 | Chae et al. | |
| 2018/0049151 A1 | 2/2018 | Yoon et al. | |
| 2018/0077679 A1 | 3/2018 | Lee et al. | |
| 2018/0098187 A1 | 4/2018 | Blankenship et al. | |
| 2018/0139763 A1 | 5/2018 | Bitra et al. | |
| 2018/0159641 A1* | 6/2018 | Xu | H04W 4/12 |
| 2019/0044677 A1* | 2/2019 | Ly | H04B 7/088 |
| 2019/0281587 A1* | 9/2019 | Zhang | H04W 72/23 |
| 2019/0349938 A1* | 11/2019 | Chen | H04W 64/00 |
| 2020/0196101 A1* | 6/2020 | Edge | H04W 64/00 |
| 2021/0045075 A1* | 2/2021 | Manolakos | H04W 64/003 |
| 2021/0091905 A1* | 3/2021 | Si | H04W 72/04 |
| 2022/0279445 A1* | 9/2022 | Shrivastava | H04W 24/02 |

FOREIGN PATENT DOCUMENTS

| | | | |
|---|---|---|---|
| CN | 107889222 A | 4/2018 | |
| JP | 2017184247 A | 10/2017 | |
| WO | WO2018137198 A1 * | 1/2017 | H04W 72/04 |

OTHER PUBLICATIONS

CN Office Action in Application No. 201810651385.6 dated Apr. 24, 2020.

"On timing reference configuration for NR device support of E-UTRAN OTDOA", Ericsson, 3GPP TSG-RAN WG2#102, R2-1807730, May 21, 2018.

Written Opinion and International Search Report in Application No. PCT/CN2019/091865 dated Dec. 30, 2020.

"3rd Generation Partnership Project; Technical Specification Group Radio Access Network; Study on Indoor Positioning Enhancements for UTRA and LTE (Release 13)," 3GPP TR 37.857, V1.0.0, pp. 1-82, (Sep. 7, 2015).

KR Office Action dated Jan. 27, 2023 as received in Application No. 10-2020-7035987.

Extended European Search Report dated Jun. 7, 2021 as received in Application No. 19822998.1.

* cited by examiner

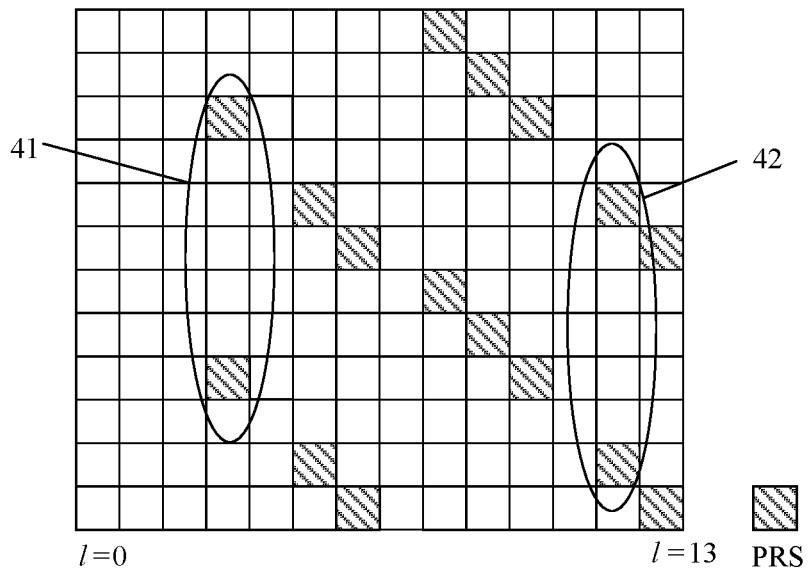
FIG. 4
Receive first target configuration information, where the first target configuration information is used to configure a positioning reference signal PRS of a terminal device — S501
FIG. 5
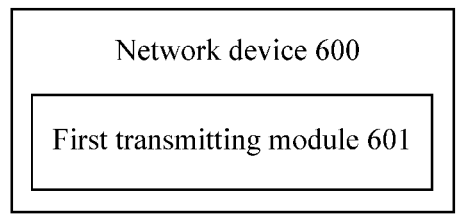
FIG. 6

METHOD FOR CONFIGURING POSITIONING REFERENCE SIGNAL IN NR SYSTEM, METHOD FOR RECEIVING POSITIONING REFERENCE SIGNAL IN NR SYSTEM, AND DEVICE

CROSS-REFERENCE TO RELATED APPLICATIONS

This application is a continuation of PCT Application No. PCT/CN2019/091865 filed on Jun. 19, 2019, which claims priority to Chinese Patent Application No. 201810651385.6 filed in China on Jun. 22, 2018, which are incorporated herein by reference in their entireties.

TECHNICAL FIELD

This disclosure relates to the field of communications technologies, and more specifically, to a method for configuring a positioning reference signal in an NR system, a method for receiving a positioning reference signal in an NR system, and a device.

BACKGROUND

In a long term evolution (LTE) system, a positioning reference signal (PRS) is transmitted on a resource block of a downlink subframe configured by a network device for transmitting the positioning reference signal, and is transmitted through an antenna port 6.

In addition, in the LTE system, the PRS cannot be mapped onto a resource element (RE) allocated to a physical broadcast channel (PBCH), a primary synchronization signal (PSS), and a secondary synchronization signal (SSS), and the PRS cannot overlap with a cell-specific reference signal (CRS) transmitted through any antenna port.

However, in a new radio (NR) system, it is still unknown how a network device configures a positioning reference signal for user equipment (UE). As a result, the UE in the NR system cannot obtain the PRS. This disclosure merely uses the NR system as an example, which does not constitute any limitation.

SUMMARY

Some embodiments of this disclosure provide a method for configuring a positioning reference signal in an NR system, a method for receiving a positioning reference signal in an NR system, and a device, so as to resolve the problem that UE cannot obtain a PRS in the NR system According to a first aspect, a method for configuring a positioning reference signal in an NR system is provided, applied to a network device, where the method includes:

transmitting first target configuration information, where the first target configuration information is used to configure a positioning reference signal PRS of a terminal device.

According to a second aspect, a method for receiving a positioning reference signal in an NR system is provided, applied to a terminal device, where the method includes:

receiving first target configuration information, where the first target configuration information is used to configure a positioning reference signal PRS of the terminal device.

According to a third aspect, a network device is provided, where the network device includes:

a first transmitting module, configured to transmit first target configuration information, where the first target configuration information is used to configure a positioning reference signal PRS of a terminal device.

According to a fourth aspect, a terminal device is provided, where the terminal device includes:

a first receiving module, configured to receive first target configuration information, where the first target configuration information is used to configure a positioning reference signal PRS of the terminal device.

According to a fifth aspect, a network device is provided, and the network device includes a memory, a processor, and a wireless communication program stored in the memory and capable of running on the processor, where when the wireless communication program is executed by the processor, the processor implements the steps of the method according to the first aspect.

According to a sixth aspect, a terminal device is provided, and the terminal device includes a memory, a processor, and a wireless communication program stored in the memory and capable of running on the processor, where when the wireless communication program is executed by the processor, the processor implements the steps of the method according to the second aspect.

According to a seventh aspect, a computer-readable medium is provided, where the computer-readable medium stores a wireless communication program, and when the wireless communication program is executed by a processor, the processor implements the steps of the method according to the first aspect or the second aspect.

In some embodiments of this disclosure, the first target configuration information used for configuring the positioning reference signal PRS of the terminal device can be transmitted, so that the terminal device in the NR system can obtain the PRS, thereby improving communication effectiveness.

BRIEF DESCRIPTION OF DRAWINGS

To describe the technical solutions in some embodiments of this disclosure or the related art more clearly, the following briefly describes the accompanying drawings required for describing the embodiments or the related art. Apparently, the accompanying drawings in the following description show merely some embodiments recorded in this disclosure, and a person of ordinary skill in the art may derive other drawings from these accompanying drawings without creative efforts.

FIG. 4 is a schematic diagram of a PRS resource mapping structure according to some embodiments of this disclosure;

FIG. 5 is a schematic flowchart of a method for receiving a positioning reference signal in an NR system according to some embodiments of this disclosure;

FIG. 6 is a schematic structural diagram 1 of a network device according to some embodiments of this disclosure;

DESCRIPTION OF EMBODIMENTS

Figure 1:
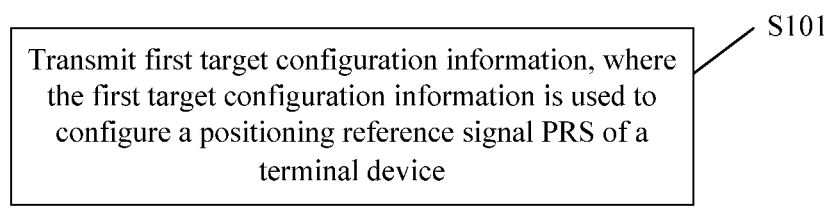
FIG. 1 is a schematic flowchart 1 of a method for configuring a positioning reference signal in an NR system according to some embodiments of this disclosure.

To make a person skilled in the art understand the technical solutions in this disclosure better, the following clearly describes the technical solutions in some embodiments of this disclosure with reference to the accompanying drawings in some embodiments of this disclosure. Apparently, the described embodiments are merely a part rather than all of the embodiments of this disclosure. All other embodiments obtained by a person of ordinary skill in the art based on the embodiments of this disclosure without creative efforts shall fall within the protection scope of this disclosure.

It should be understood that, the technical solutions of some embodiments of this disclosure may be applied to various communications systems, such as a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, LTE time division duplex (TDD), a universal mobile telecommunications system (UMTS), a worldwide interoperability for microwave access (WiMAX) communications system, a 5G system, or a new radio (NR) system.

User equipment (UE), also referred to as a mobile terminal, a mobile terminal device, or the like, may communicate with one or more core networks through a radio access network (RAN). The terminal device may be a mobile terminal, such as a mobile phone (or referred to as a "cellular" phone) or a computer with a mobile terminal. For example, the terminal device may be a portable, pocket-sized, handheld, computer built-in, or in-vehicle mobile apparatus, which exchanges voice and/or data with the radio access network.

A network device is an apparatus deployed in a radio access network and used for providing terminal devices with a positioning reference signal configuration function of the NR system. The network device may be a base station, and the base station may be a base transceiver station (BTS) in GSM or CDMA, may be a base station (NodeB) in WCDMA, an evolved NodeB (evolutional Node B, eNB or e-NodeB) in LTE or a 5G base station (gNB), or may be a location server (E-SMLC, evolved serving mobile location center) in LTE and a location server (location management function) in 5G, or a network-side device in a later evolved communications system. However, the wording does not constitute any limitation on the protection scope of this disclosure.

It should be noted that during description of specific embodiments, sequence numbers of the processes do not mean the order of execution. The execution order of the processes should be determined according to functions and internal logic of the processes, and the sequence numbers should not be construed as any limitation on the implementation processes of some embodiments of this disclosure.

It should be noted that the following merely uses the NR system as the example to illustrate a method for configuring a positioning reference signal, a method for receiving a positioning reference signal, and a device provided by some embodiments of this disclosure. It should be understood that the method for configuring a positioning reference signal, the method for receiving a positioning reference signal, and the device provided by some embodiments of this disclosure can also be applied to other communications systems, without being limited to the NR system.

The following describes the method for configuring a positioning reference signal in the NR system applied to the network device with reference to FIG. 1 to FIG. 4.

FIG. 1 shows a method for configuring a positioning reference signal in an NR system according to this disclosure, which is applied to a network device. As shown in FIG. 1, the method may include the following steps.

Step 101: Transmit first target configuration information, where the first target configuration information is used to configure a positioning reference signal PRS of a terminal device.

According to the method for configuring a positioning reference signal in the NR system provided in the embodiment shown in FIG. 1, the first target configuration information used for configuring the positioning reference signal PRS of the terminal device can be transmitted, so that the terminal device in the NR system can obtain the PRS, thereby improving communication effectiveness.

The following describes the manner of transmitting the first target configuration information and content contained in the first target configuration information with reference to specific embodiments.

Optionally, the network device selects a plurality of cells from cells within a predetermined distance from the terminal device, configures the first target configuration information for the terminal device through the plurality of cells, and transmits the first target configuration information. To be specific, the network device may select N cells from the cells near the terminal device, and configure the first target configuration information and the PRS for the terminal device in the N cells.

The network device may be an upper-layer device of the cell, for example, the network device may be a positioning server on a network side. The predetermined distance may be configured according to actual needs, which is not limited in this embodiment.

More specifically, the network device may select the plurality of cells from the cells within the predetermined distance from the terminal device in, not limited to, one or more of the following first to third manners.

Manner 1: Select the plurality of cells from the cells within the predetermined distance from the terminal device based on radio resource management RRM reports of the cells within the predetermined distance from the terminal device.

Specifically, the network device may select N cells with best reference signal received power (RSRP) or reference signal received quality (RSRQ) from the cells within the predetermined distance from the terminal device based on the RRMs of the cells, for example, sorting the cells within the predetermined distance from the terminal device based on the RSRP or the RSRQ, and selecting top N cells to transmit the first target configuration information. Alternatively, the network device may select N cells with best signal to interference plus noise ratio (SINR) from the cells within the predetermined distance from the terminal device based on the RRMs of the cells, for example, sorting the cells within the predetermined distance from the terminal device based on the SINR, and selecting top N cells to transmit the first target configuration information.

Manner 2: Select the plurality of cells from the cells within the predetermined distance from the terminal device based on pre-estimation of a location of the terminal device. For example, a geographical location of the terminal device is roughly determined, and then the plurality of cells are selected from cells that are helpful for positioning measurement of the terminal device.

Manner 3: Select the plurality of cells from the cells within the predetermined distance from the terminal device based on time of arrival (TOA) of PRSs transmitted from the cells within the predetermined distance from the terminal device. For example, in the cells within the predetermined distance from the terminal device, N cells with a minimum variance of TOA measurement deviations, N cells with a minimum delay spread, or N cells with a minimum TOA are selected as the plurality of cells.

In addition, the plurality of cells that are selected by the network device for configuring the PRS for the terminal device have a same subcarrier spacing (or a same numerology). Correspondingly, PRSs simultaneously received by the terminal device from the plurality of cells correspond to the same numerology. In other words, the terminal device does not expect that the PRSs simultaneously received from the plurality of cells correspond to different numerologies.

When the plurality of cells are selected for the terminal device based on any one of the foregoing three manners, the plurality of selected cells may be directly used as the cells for configuring the PRS for the terminal device. When the plurality of cells are selected for the terminal device based on more than one of the foregoing three manners, the plurality of cells selected in different manners and a quantity of selected cells may be different. In this case, a plurality of cells can be further selected from the plurality of cells selected in the different manners and are used as the cells for configuring the PRS for the terminal device. For example, it is assumed that a plurality of cells selected in manner 1 are cell 1, cell 2, cell 3, cell 4, and cell 5, and a plurality of cells selected in manner 2 are cell 2, cell 3, cell 4, cell 5, and cell 6. In this case, a plurality of same cells selected in manner 1 and manner 2 may be finally used as the cells for configuring the PRS for the terminal device, that is, cell 2, cell 3, cell 4, and cell 5 are finally used as the cells for configuring the PRS for the terminal device.

Certainly, in addition to using the plurality of same cells selected in the different manners as the cells for configuring the PRS for the terminal device, a plurality of cells may be further selected in another manner from the plurality of cells that are selected in the different manners, and are finally used as the cells for configuring the PRS for the terminal device, which is not limited in this disclosure.

Optionally, the first target configuration information includes a generation parameter of the PRS. After step 101, the method for configuring a positioning reference signal in the NR system provided in some embodiments of this disclosure may further include: generating the PRS based on the generation parameter, and transmitting the PRS.

The generation parameter is associated with at least one of the following parameters: a slot index in a radio frame in which the PRS is located; an index of an orthogonal frequency division multiplexing (OFDM) symbol in a slot in which the PRS is located; a cyclic prefix (CP) type of the PRS; cell ID information of the PRS; an ID of the terminal device or an ID of a user group to which the terminal device belongs; and an ID of a synchronization signal block (SSB).

The CP includes a normal cyclic prefix (NCP) and an extended cyclic prefix (ECP). Cell ID information may be a physical cell ID or a virtual cell ID.

More specifically, a PRS sequence may be generated through quadrature phase shift keying (QPSK) modulation on a pseudo-random sequence, where the pseudo-random sequence c(n) may be a gold sequence, and correspondingly, the generation parameter may also be referred to as a generation parameter of the gold sequence.

In an example, if the pseudo-random sequence c(n) is a gold sequence, c(n) may be specifically an exclusive OR result of two m sequences (or a modulo-2 addition result of two m sequences), and a length of c(n) may be M, where n=0, 1, . . . , M−1. The expression of c(n) is:

$$c(n)=(x_1(n+N_c)+x_2(n+N_c))\bmod 2, \text{ where}$$

$x_1(n+31)=(x_1(n+3)+x_1(n))\bmod 2$ is used to generate a first m sequence, and an initialization state of $x_1$ is $x_1(0)=1$, $x_1(n)=0$, and n=1, 2, . . . , 30.

$x_2(n+31)=(x_2(n+3)+x_2(n+2)+x_2(n+1)+x_2(n))\bmod 2$ is used to generate a second m sequence, an initialization state of $x_2$ may be expressed in a binary form of a decimal number $C_{init}$, where $C_{init}$ may also be understood as an initial value of a generated sequence of the pseudo-random sequence c(n).

The symbol "mod" is a symbol for obtaining a remainder and may be called "modulo".

$N_c=1600$, where the meaning of Nc may be understood as: after two very long sequences are generated according to the expressions of $x_1$ and $x_2$, M bits are read backwards from the 1600th digit of the two very long sequences to obtain two m sequences of M bits, and then modulo-2 addition is performed on the two m sequences to obtain c(n).

The initial value $C_{init}$ of the pseudo-random sequence c(n) can be expressed as:

$$c_{init}=(2^{17}\cdot(14\cdot n_{sf}^{\mu}+l+1)\cdot(2\cdot N_{ID}^{PRS}+1)+2^{11}\cdot N_{ID}^{SSB}+2\cdot N_{ID}^{PRS}+N_{CP})\bmod 2^{31},$$

where $n_{sf}$ represents a slot index in a radio frame; l represents an OFDM symbol index in a slot; $N_{ID}^{PRS}$ represents a physical cell ID, a virtual cell ID, or a network-configured ID; $N_{CP}$ is related to the CP type, $N_{CP}$ is equal to 1 for the normal CP, and $N_{CP}$ is equal to 0 for the extended CP; μ represents a numerical value configured with a value of numerology (the numerology is described below by using a table; for details, refer to the subsequent description); and $N_{ID}^{SSB}$ represents an SSB index in an SSB burst set, and has a value ranging from 0 to 63.

On this basis, the PRS sequence obtained through QPSK modulation on the gold sequence is:

$$r(m) = \frac{1}{\sqrt{2}}(1 - 2\cdot c(2m)) + j\frac{1}{\sqrt{2}}(1 - 2\cdot c(2m+1))$$

Optionally, the first target configuration information may include: time domain position information and frequency domain position information of an resource element RE occupied by the PRS, the frequency domain position is associated with a specified numerology of the network device, and the frequency domain position information includes start point information of the frequency domain position. The start point information is the first subcarrier on the first common resource block of the network device.

Correspondingly, the step of "transmitting the PRS" may specifically include: transmitting the PRS at the time domain position and the frequency domain position that is associated with the specified numerology.

Specifically, for a specified numerology, the network device may map the PRS onto a resource element (RE) with a time-frequency position (k,l) to transmit the PRS, where k represents a frequency domain position corresponding to the numerology. Similar to that in the previous example, l represents an OFDM symbol index in a slot, a start point of the frequency domain position of the PRS is a subcarrier 0 on a common resource block 0 of a cell transmitting the PRS, that is, a point A (reference point A) of the cell, and correspondingly, k=0.

The reference point A may be that, in an OFDM baseband signal generation process, it is necessary to ensure that subcarriers 0 of all common RBs for transmission with different subcarrier spacings (subcarrier spacing, SCS) on a same carrier are aligned, that is, boundaries of all common RBs on the same carrier need to be aligned.

For example, it is assumed that cell A and cell B are cells selected by the network device for transmitting the first target configuration information and the PRS to the terminal device, that is, assuming that cell A and cell B are positioning cells of the terminal device.

Then, in cell A, the network device configures a PRS with a numerology being μ, and (k,l) is used to indicate a time-frequency position of an RE occupied by the PRS, where l represents an OFDM symbol index in a slot, and k represents a frequency domain position when the numerology is μ, and a start point of the frequency domain position of the PRS is a subcarrier 0 on a common resource block 0 of the cell A, that is, a point A of the cell A, correspondingly, k=0.

In cell B, the network device configures a PRS with a numerology being μ, and (k1,l1) is used to indicate a time-frequency position of an RE occupied by the PRS, where l1 represents an OFDM symbol index in a slot, and k1 represents a frequency domain position when the numerology is μ, and a start point of the frequency domain position of the PRS is a subcarrier 0 on a common resource block 0 of the cell B, that is, a point A of the cell B, correspondingly, k=0.

The following describes the numerology in the NR system with reference to the tables.

Different from an LTE system that supports only a 15 kHz subcarrier spacing, the NR system supports a plurality of basic parameter designs, such as 15 kHz, 30 kHz, 60 kHz, 120 kHz, and 240 kHz subcarrier spacings ($\Delta f$), so as to support spectrums from hundreds of MHz to tens of GHz. The NR can support a variety of numerologies related to subcarrier spacing, which is specifically shown in Table 1:

TABLE 1

| Supported transmission numerologies | | |
|---|---|---|
| μ | $\Delta f = 2^\mu \cdot 15$ [kHz] | CP |
| 0 | 15 | Normal |
| 1 | 30 | Normal |
| 2 | 60 | Normal, extended |
| 3 | 120 | Normal |
| 4 | 240 | Normal |

Correspondingly, slot configurations based on different numerologies in the NR system are shown in Table 2 and Table 3. Table 2 corresponds to the normal cyclic prefix, and Table 3 corresponds to the extended cyclic prefix.

TABLE 2

Quantity of OFDM symbols $N_{symb}^{slot}$ in each slot corresponding to the normal cyclic prefix, quantity of slots $N_{slot}^{frame,\mu}$ in each radio frame, and quantity of slots $N_{slot}^{subframe,\mu}$ in each subframe

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Quantity of OFDM symbols $N_{symb}^{slot}$ in each slot corresponding to the extended cyclic prefix, quantity of slots $N_{slot}^{frame,\mu}$ in each radio frame, and quantity of slots $N_{slot}^{subframe,\mu}$ in each subframe

| μ | $N_{symb}^{slot}$ | $N_{slot}^{frame,\mu}$ | $N_{slot}^{subframe,\mu}$ |
|---|---|---|---|
| 2 | 12 | 40 | 4 |

Figure 2:
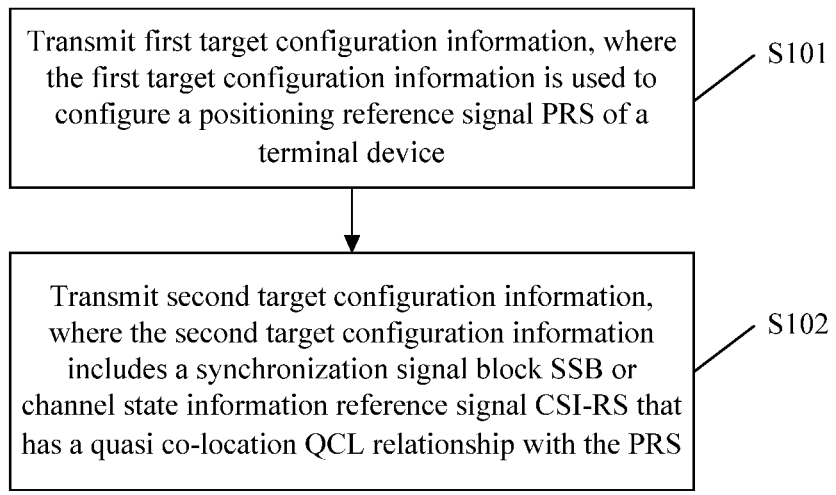
FIG. 2 is a schematic flowchart 2 of a method for configuring a positioning reference signal in an NR system according to some embodiments of this disclosure.

Optionally, as shown in FIG. 2, the method for configuring a positioning reference signal in the NR system provided in some embodiments of this disclosure may further include:

Step 102: Transmit second target configuration information, where the second target configuration information includes a synchronization signal block SSB or channel state information reference signal (CSI-RS) that has a quasi co-location (QCL) relationship with the PRS.

Certainly, the second target configuration information may further include other signals that have a quasi co-location (QCL) relationship with the PRS, which is not limited in some embodiments of this disclosure.

The SSB or the CSI-RS that has a QCL relationship with the PRS is used to provide the first target configuration information to the terminal device, and the first target configuration information that is provided includes at least one of time information or beam information of the PRS. The time information may include an average delay and/or an extended delay.

If signals of two antenna ports meet the QCL relationship, channels passed through by the two signals are approximately the same in at least one of Doppler shift, Doppler spread, average delay, delay spread, or spatial reception parameter. The QCL may include the following several types:

QCL-TypeA: {Doppler shift, Doppler spread, average delay, delay spread}
QCL-TypeB: {Doppler shift, Doppler spread}
QCL-TypeC: {Average delay, Doppler shift}
QCL-TypeD: {space Rx parameter}.

It can be understood that providing the time information and beam information of the PRS to the terminal device by using a signal having a QCL relationship with the PRS can implement auxiliary positioning of the terminal device. During positioning, the terminal device may obtain positioning information such as an angle of arrival (AOA) of a transmit beam based on the beam information provided by the SSB or CSI-RS, to assist positioning.

Specifically, ID information of the PRS-associated SSB may be added to the initial value ($C_{init}$) of the pseudo-random sequence of the PRS. During positioning, the terminal device may obtain an associated-SSB ID through detection on the PRS sequence. With a known SSB ID, the terminal device is able to learn which beam the PRS is transmitted on, so as to obtain information such as the AOA of the transmit beam, to assist positioning.

Optionally, the first target configuration information may further include at least one of the following information: cell ID information of the PRS, positioning performance indicator information of the terminal device, slot configuration information for configuring the PRS by the network device, subcarrier spacing information for configuring the PRS by the network device, bandwidth information configured for the terminal device by the network device, cyclic prefix CP information of the PRS, port information for configuring the PRS by the network device, and power gain information of the PRS.

The cell ID information may be a physical cell identifier or a virtual cell identifier of the cell in which the PRS is located.

The positioning performance indicator information of the terminal device may include target positioning accuracy and target delay information. The positioning performance indicator information is a positioning performance indicator required in a scenario in which the terminal device is located. Generally, these performance indicators are related to a PRS resource mapping pattern. If the current scenario requires high positioning accuracy, a PRS resource mapping pattern with good positioning performance is used; if the current scene requires low positioning accuracy, a PRS resource mapping pattern with ordinary positioning performance is used. If the current scenario requires a high positioning delay, a PRS resource mapping pattern with a smaller delay is used; if the current scenario does not require a high positioning delay, a PRS resource mapping pattern with a smaller delay is not used.

The slot configuration information for configuring the PRS by the network device includes information such as information about a quantity of consecutive downlink slots occupied by a positioning burst, PRS cycle information, and a slot offset of the PRS signal.

For example, the positioning reference signal may be transmitted in $N_{PRS}$ consecutive downlink slots, where a first one of the $N_{PRS}$ consecutive downlink slots satisfies the following formula:

$$(N_{slot}^{frame,\mu} \times n_f + n_s - \Delta_{PRS}) \bmod T_{PRS} = 0, \text{ where}$$

$N_{slot}^{frame,\mu}$ is a quantity of slots included in a radio frame corresponding to a numerology, $n_f$ is a radio frame index, $n_s$ is a slot index in a radio frame, $\Delta_{PRS}$ is a slot offset of the PRS signal, and $T_{PRS}$ is a transmission period of the PRS signal.

The subcarrier spacing information for configuring the PRS by the network device may be subcarrier width information for configuring the PRS of the terminal device by the network device.

The cyclic prefix CP information of the PRS contains normal CP or extended CP information, where the extended CP is used in a measurement cell far away from the terminal device. When the network device configures a PRS that needs to be transmitted through a cell, the network device configures either the normal CP or the extended CP. Generally, the normal CP and the extended CP are not both configured. In addition, considering that the network device may configure the PRS through a cell far away from the terminal device, the extended CP is allowed to configure on one or more numerologies other than 60 kHz ($\mu=2$).

The port information for configuring (or transmitting) the PRS by the network device may be logical port information for transmitting the PRS in the cell, including a quantity of ports and port index information.

The power gain (power boosting) information of the PRS may be a power gain parameter configured for each RE of the PRS by the network device. The power gain information is related to at least one of a quantity of cells participating in positioning, a quantity of PRS ports, or PRS resource mapping pattern information.

Optionally, the first target configuration information may be configured based on a bandwidth part BWP; or the first target configuration information may be configured based on a cell.

BWP-based configuration means that all configurations of the PRS are configured on the BWP, and different BWPs have different PRS configurations. Cell-based configuration means that all configurations of the PRS are configured in the cell, and different cells have different PRS configurations. For example, the BWP-based configuration is similar to configuration of CSI-RS and demodulation reference signal (DMRS) in the NR R-15, that is, the PRS is configured on the BWP. For the cell-based configuration, the PRS can be configured at a cell level.

Optionally, the first target configuration information may further include: resource multiplexing information of the PRS and a second preset signal.

The second preset signal includes, but is not limited to, at least one of a synchronization signal block SSB, a channel state information reference signal CSI-RS, a physical downlink control channel (PDCCH), a physical downlink shared channel (PDSCH), a tracking reference signal (TRS), a phase tracking reference signal (PTRS), or a demodulation reference signal DMRS.

To be specific, the PRS is configured to multiplex or not multiplex with other signals or channels (such as the SSB, CSI-RS, TRS, DMRS, PTRS, PDCCH, or PDSCH), that is, whether the PRS needs to avoid collision with other reference signals or channels, or whether to be frequency division multiplexed or time division multiplexed with other reference signals or channels.

For example, assuming that a signal having a multiplexing relationship with the PRS is the PDSCH, the network device may configure PDSCH-related multiplexing information for the PRS.

Specifically, for example, in a frequency range 1 (low frequency range), the network device configures to skip transmitting the PDSCH in a slot transmitting the PRS, that is, the PRS and the PDSCH do not multiplex resources.

For another example, in a frequency range 2 (high frequency range), if the PRS has a QCL association with the PDSCH, there are two configuration schemes. In one scheme, the terminal device is allowed to receive the PRS and the PDSCH at the same time, and if the PRS and the PDSCH collide, the PDSCH is discarded at a location of the resource element RE, and rate matching is performed between the PDSCH and other resource elements. In the other scheme, the network device does not transmit the PDSCH in the slot, that is, the PRS and the PDSCH do not multiplex resources. If the PRS and the PDSCH have no QCL association relationship, the terminal device receives only the PRS or only the PDSCH in the slot.

Optionally, the first target configuration information or the second target configuration information described in any one of the foregoing embodiments may be transmitted in at least one of the following manners: transmitting the first target configuration information based on higher-layer signaling, for example, radio resource control (RRC); transmitting the first target configuration information based on MAC-layer signaling; or transmitting the first target configuration information based on downlink control information (DCI) or based on the LPP (LTE positioning protocol) between the UE and a location server.

Certainly, some of the first target configuration information, such as PRS bandwidth and other information, may alternatively be specified by the protocol. For the first target configuration information that can be specified by the protocol, the network device may not transmit the first target configuration information to the terminal device; instead, the terminal device itself obtains the first target configuration information by querying the protocol, thereby saving transmission resources of the network device.

Figure 3:
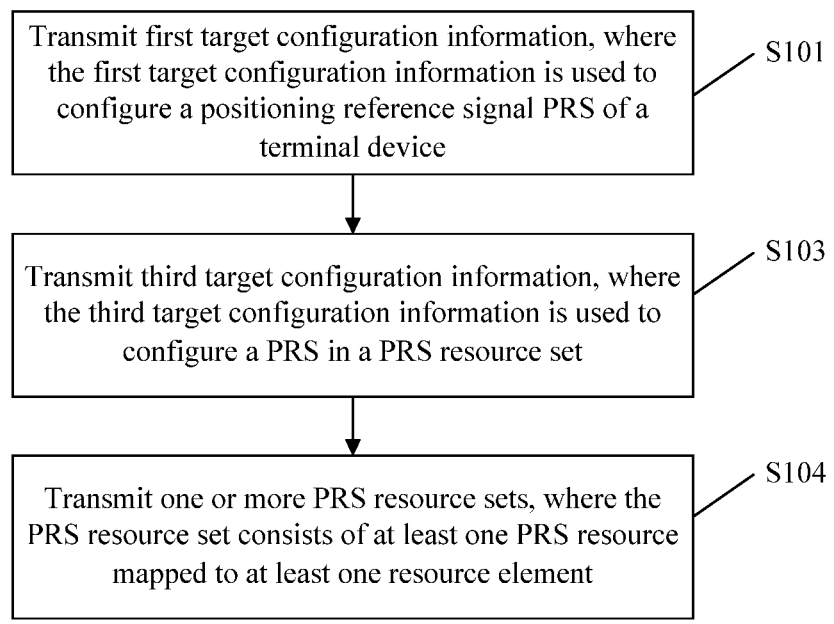
FIG. 3 is a schematic flowchart 3 of a method for configuring a positioning reference signal in an NR system according to some embodiments of this disclosure.

Optionally, as shown in FIG. 3, the method for configuring a positioning reference signal in the NR system provided in any one of the foregoing embodiments may further include the following steps.

Step 104: Transmit one or more PRS resource sets, where the PRS resource set consists of at least one PRS resource mapped onto at least one resource element.

Specifically, the network device may configure one PRS resource set in one slot. The PRS resource set may include a plurality of periodic PRS resources, and the plurality of PRS resources in one slot have the same period, bandwidth, and frequency domain density. Specific time domain and frequency domain positions of the PRS resources may be flexibly configured by an upper layer.

As shown in FIG. 4 (FIG. 4 is a schematic diagram of a PRS resource mapping structure according to some embodiments of this disclosure), the network device may configure one PRS resource set in one slot (including 14 OFDM symbols numbered 0 to 13). The one PRS resource set contains 8 periodic PRS resources. In FIG. 4, PRSs mapped onto two resource elements at different frequency domain positions in the same OFDM symbol, as denoted by reference numerals 41 and 42, are one PRS resource.

Optionally, as shown in FIG. 3, before step 104, the method for configuring a positioning reference signal in the NR system provided in any one of the foregoing embodiments may further include the following steps.

Step 103: Transmit third target configuration information, where the third target configuration information is used to configure a PRS in the PRS resource set.

The third target configuration information includes, but is not limited to, one or more of the following information:

(1) a resource configuration identifier corresponding to the PRS in the PRS resource set, which may also be referred to as a PRS resource ID;

(2) period information and slot information of the PRS in the PRS resource set, such as a slot offset;

(3) mapping information between the PRS in the PRS resource set and a resource of the network device. The resource mapping information may include PRS resource transmission port information, OFDM symbol and subcarrier occupation positions, frequency domain density, bandwidth information, and so on, where the frequency domain density may be a PRS frequency domain density of each physical resource block (PRB) on each PRS transmit port. The PRS may be distributed at equal intervals in the frequency domain, and the bandwidth information may include PRS bandwidth and initial frequency domain PRB index information;

(4) power control information of the PRS in the PRS resource set, where the power control information may include at least one of a ratio of a PRS energy per resource element (EPRE) to an SSB EPRE or a ratio of the PRS EPRE to a PDSCH EPRE;

(5) the generation parameter used for generating the PRS in the PRS resource set, for example, scrambling code ID information used for determining an initial value of the pseudo-random sequence of the PRS, and the scrambling code ID information may be configured by the network device;

(6) bandwidth part BWP information of the PRS in the PRS resource set, where the BWP information defines on which BWP the network device configures the PRS; and (7) QCL information of the PRS in the PRS resource set, where the QCL information includes PRS transmission configuration indicator (TCI) status information, and the status information is used to indicate a QCL source reference signal of the PRS.

In addition, similar to the first target configuration information or the second target configuration information, the third target configuration information may also be transmitted in at least one of the following manners: transmitting the third target configuration information based on higher-layer signaling (for example, RRC), transmitting the third target configuration information based on MAC-layer signaling, or transmitting the third target configuration information based on downlink control information DCI, or transmitting the third target configuration information based on the positioning protocol LPP (LTE positioning protocol) between the UE and the location server.

In addition, some of the third target configuration information may alternatively be specified by the protocol, such as PRS bandwidth and other information. For the third target configuration information that can be specified by the protocol, the network device may not transmit the third target configuration information to the terminal device; instead, the terminal device itself obtains the third configuration information by querying the protocol, thereby saving transmission resources of the network device.

In summary, according to the method for configuring a positioning reference signal in the NR system provided in some embodiments of this disclosure, the first target configuration information used for configuring the positioning reference signal PRS of the terminal device can be transmitted, so that the terminal device in the NR system can obtain the PRS, thereby improving communication effectiveness.

The foregoing describes the method for configuring a positioning reference signal in the NR system applied to the network device. The following describes a method for receiving a positioning reference signal in an NR system applied to a terminal device provided in some embodiments of this disclosure with reference to FIG. 5.

As shown in FIG. 5, the method for receiving a positioning reference signal in the NR system according to an embodiment of this disclosure is applied to the terminal device and may include the following steps.

Step 501: Receive first target configuration information, where the first target configuration information is used to configure a positioning reference signal PRS of the terminal device.

According to the method for receiving a positioning reference signal in the NR system provided in the embodiment shown in FIG. 5, the first target configuration information used for configuring the positioning reference signal PRS of the terminal device can be received, and therefore the PRS can be obtained.

The following describes a manner of receiving the first target configuration information and content contained in the first target configuration information with reference to specific embodiments.

Optionally, the first target configuration information is configured by a network device for the terminal device through one cell in a plurality of cells, where the plurality of cells are selected and determined by the network device from cells within a predetermined distance from the terminal device.

More specifically, the network device may select the plurality of cells from the cells within the predetermined distance from the terminal device in one or more of the following manners:

selecting the plurality of cells from the cells within the predetermined distance from the terminal device based on radio resource management RRM reports of the cells within the predetermined distance from the terminal device;

selecting the plurality of cells from the cells within the predetermined distance from the terminal device based on pre-estimation of a location of the terminal device; and selecting the plurality of cells from the cells within the predetermined distance from the terminal device based on times of arrival TOA of PRSs transmitted in the cells within the predetermined distance from the terminal device.

Optionally, the first target configuration information includes a generation parameter of the PRS, and after the receiving the first target configuration information, the method further includes: receiving the PRS, where the PRS is generated based on the generation parameter.

The generation parameter is associated with at least one of the following parameters:

a slot index in a radio frame in which the PRS is located;

an index of an orthogonal frequency division multiplexing OFDM symbol in a slot in which the PRS is located;

a cyclic prefix CP type of the PRS;

cell ID information of the PRS;

an ID of the terminal device or an ID of a user group to which the terminal device belongs; and an ID of a synchronization signal block SSB.

Optionally, the first target configuration information includes: time domain position information and frequency domain position information of an resource element RE occupied by the PRS, the frequency domain position is associated with a specified numerology of the network device, and the frequency domain position information includes start point information of the frequency domain position. The start point information is the first subcarrier on the first common resource block of the network device.

Correspondingly, the terminal device may receive the PRS at the time domain position and the frequency domain position that is associated with the specified numerology.

Specifically, the terminal device may receive a PRS that is mapped onto a resource element (RE) with a time-frequency position (k,l) for a specified numerology, where k represents a frequency domain position corresponding to the numerology, l represents an OFDM symbol index in a slot, a start point of the frequency domain position of the PRS is a subcarrier 0 on a common resource block 0 of a cell transmitting the PRS, that is, a point A (reference point A) of the cell, and correspondingly, k=0.

Optionally, the method for receiving a positioning reference signal in the NR system provided in this disclosure may further include: receiving second target configuration information, where the second target configuration information includes a synchronization signal block SSB or channel state information reference signal CSI-RS that has a quasi co-location QCL relationship with the PRS.

The SSB or the CSI-RS is used to provide the first target configuration information to the terminal device, and the first target configuration information that is provided includes at least one of time information or beam information of the PRS.

Optionally, the first target configuration information further includes at least one of the following information: cell ID information of the PRS, positioning performance indicator information of the terminal device, slot configuration information for configuring the PRS by the network device, subcarrier spacing information for configuring the PRS by the network device, bandwidth information configured for the terminal device by the network device, cyclic prefix CP information of the PRS, port information for configuring the PRS by the network device, and power gain information of the PRS.

Optionally, the first target configuration information is configured based on a bandwidth part BWP; or the first target configuration information is configured based on a cell.

Optionally, the first target configuration information further includes: resource multiplexing information of the PRS and a second preset signal.

The second preset signal includes at least one of a synchronization signal block SSB, a channel state information reference signal CSI-RS, a physical downlink control channel PDCCH, a physical downlink shared channel PDSCH, a tracking reference signal TRS, a phase tracking reference signal PTRS, or a demodulation reference signal DMRS.

Optionally, the terminal device may receive the first target configuration information or the second target configuration information in at least one of the following manners: receiving the first target configuration information based on higher-layer signaling, or receiving the first target configuration information based on MAC-layer signaling, or receiving the first target configuration information based on downlink control information DCI.

Certainly, for some of the first target configuration information or the second target configuration information that can be specified by the protocol, the terminal device itself obtains the first target configuration information or the second target configuration information by querying the protocol, with no need to receive the first target configuration information or the second target configuration information from the network device, thereby saving transmission resources of the network device.

Optionally, the method for receiving a positioning reference signal in the NR system shown in FIG. 5 may further include: receiving one or more PRS resource sets, where the PRS resource set consists of at least one PRS resource mapped onto at least one resource element.

Optionally, before the one or more PRS resource sets are received, the method for receiving a positioning reference signal in the NR system shown in FIG. 5 may further include: receiving third target configuration information, where the third target configuration information is used to configure a PRS in the PRS resource set.

The third target configuration information includes one or more of the following information: an resource configuration identifier corresponding to the PRS in the PRS resource set; period information and slot information of the PRS in the PRS resource set; mapping information between the PRS in the PRS resource set and a resource of the network device; power control information of the PRS in the PRS resource set; a generation parameter for generating the PRS in the PRS resource set; bandwidth part BWP information of the PRS in the PRS resource set; and QCL information of the PRS in the PRS resource set.

Optionally, similar to receiving the first target configuration information or the second target configuration information, the terminal device may receive the third target configuration information in at least one of the following manners: receiving the third target configuration information based on higher-layer signaling (for example, RRC), receiving the third target configuration information based on MAC-layer signaling, or receiving the third target configuration information based on downlink control information DCI, or receiving the third target configuration information based on the positioning protocol LPP (LTE positioning protocol) between the UE and the location server.

In addition, for some of the third target configuration information that can be specified by the protocol, the terminal device itself obtains the third target configuration information by querying the protocol, with no need to receive the third target configuration information from the network device, thereby saving transmission resources of the network device.

The method for receiving a positioning reference signal in the NR system provided in some embodiments of this disclosure corresponds to the method for configuring a positioning reference signal in the NR system provided in some embodiments of this disclosure. Therefore, in this specification, the description of the method for receiving a positioning reference signal in the NR system is relatively simple. For related details, refer to the foregoing description of the method for configuring a positioning reference signal in the NR system.

Optionally, after receiving the PRS configured by the network device, the terminal device may further perform positioning based on the PRS. The following uses an example in which the PRS is applied to observed time difference of arrival (OTDOA) positioning, to briefly describe a process of positioning the terminal device based on the PRS.

Figure 12:
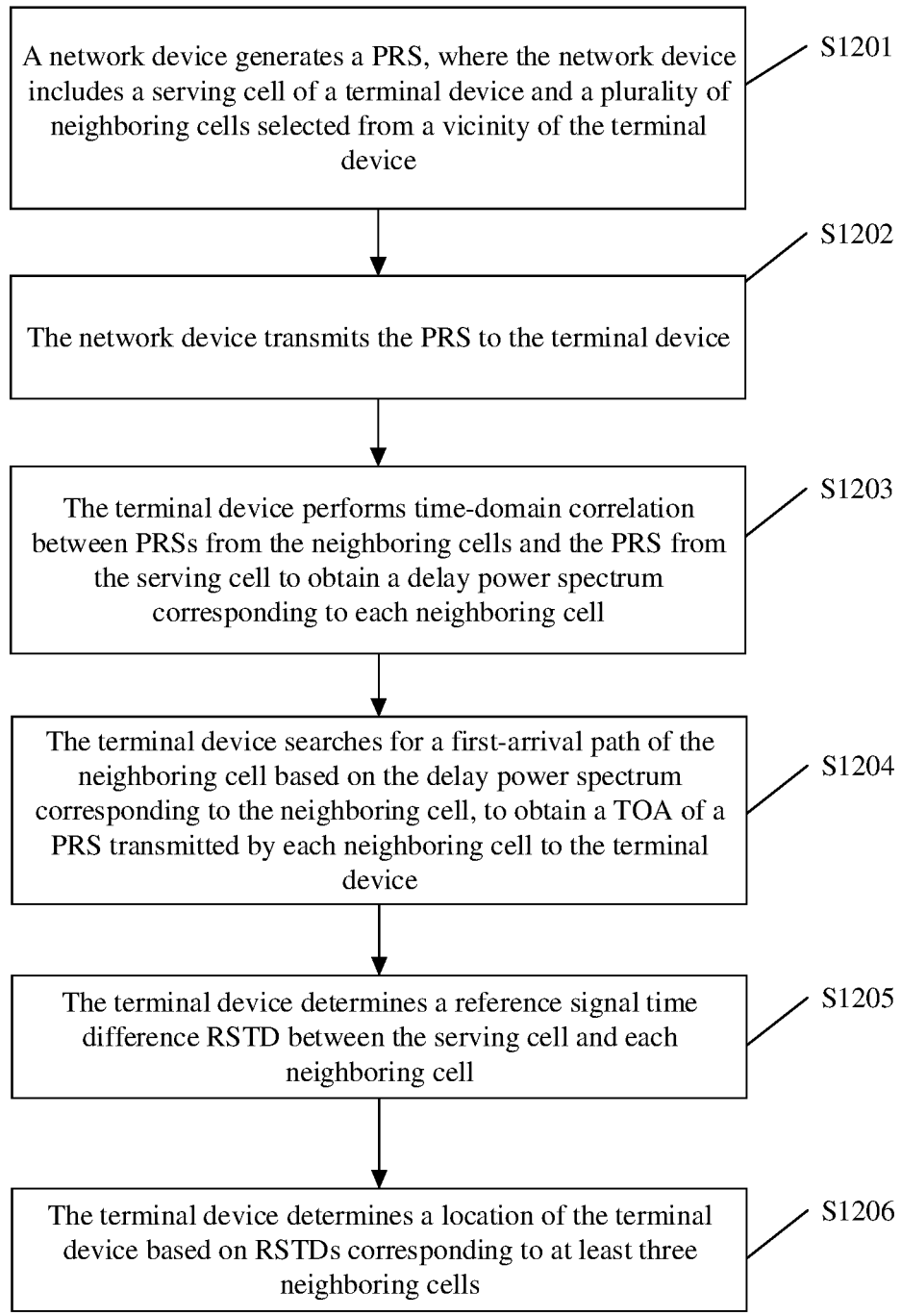
FIG. 12 is a schematic flowchart of a positioning method according to some embodiments of this disclosure.

As shown in FIG. 12, a PRS-based positioning process of the OTDOA positioning method may include the following steps.

Step 1201: A network device generates a PRS, where the network device includes a serving cell of a terminal device and a plurality of neighboring cells selected from a vicinity of the terminal device.

Step 1202: The network device transmits the PRS to the terminal device.

Step 1203: The terminal device performs time-domain correlation between PRSs from the neighboring cells and the PRS from the serving cell to obtain a delay power spectrum corresponding to each neighboring cell.

The PRS from the serving cell may also be referred to as a local PRS of the terminal device.

Step 1204: The terminal device searches for a first-arrival path of the neighboring cell based on the delay power spectrum corresponding to the neighboring cell, to obtain a TOA of a PRS transmitted by each neighboring cell to the terminal device.

Step 1205: The terminal device determines a reference signal time difference (RSTD) between the serving cell and each neighboring cell.

Step 1206: The terminal device determines a location of the terminal device based on RSTDs corresponding to at least three neighboring cells.

Specifically, coordinates of the terminal device may be calculated.

In the foregoing process, the terminal device does not obtain an accurate time of arrival (TOA) of the PRS, and the location of the terminal device is determined based on the time difference of arrival (TDOA) of at least three neighboring cells, that is, determined by relative time rather than absolute time.

Figure 13:
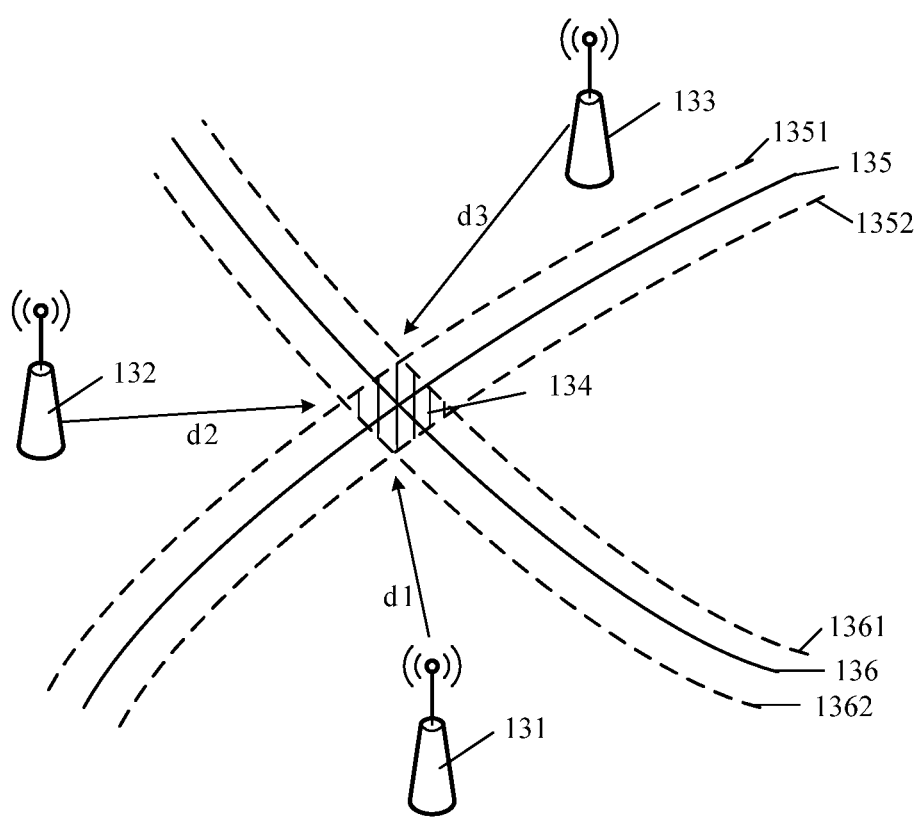
FIG. 13 is a schematic flowchart of a principle of a positioning method according to some embodiments of this disclosure.

FIG. 13 shows a principle diagram of OTDOA positioning. It can be seen from FIG. 13 that the three neighboring cell base stations (a first neighboring cell base station 131, a second neighboring cell base station 132, and a third neighboring cell base station 133) participating in positioning may limit the terminal device to a very small area 134, and distances from the first neighboring cell base station 131, the second neighboring cell base station 132, and the third neighboring cell base station 133 to the terminal device are d1, d2, and d3, respectively. In an ideal condition, the location of the terminal device is at an intersection of a first curve 135 and a second curve 136. However, there are deviations in positions of the first curve 135 and the second curve 136, specifically, the position of the first curve 135 may be between a first dashed line 1351 and a second dashed line 1352, and the position of the second curve 136 may be between a third dashed line 1361 and a fourth dashed line 1362. Therefore, the location of the terminal device determined based on the three neighboring cell base stations is in the area 134. One more neighboring cell base station may be added to limit the terminal device to another area, and an overlapping area can be obtained to narrow a location range of the terminal device. It is easy to understand that more neighboring cell base stations participating in positioning indicates higher positioning accuracy.

The following describes the network device and the terminal device in some embodiments of this disclosure in detail with reference to FIG. 6 to FIG. 9.

FIG. 6 shows a schematic structural diagram of a network device according to some embodiments of this disclosure. As shown in FIG. 6, the network device 600 includes: a first transmitting module 601.

The network device 600 provided in some embodiments of this disclosure can transmit the first target configuration information used for configuring the positioning reference signal PRS of the terminal device, so that the terminal device in the NR system can obtain the PRS, thereby improving communication effectiveness.

The network device 600 is described below with reference to specific embodiments.

Optionally, the first transmitting module 601 may be specifically configured to:

select a plurality of cells from cells within a predetermined distance from the terminal device; and configure the first target configuration information for the terminal device through the plurality of cells, and transmit the first target configuration information.

More specifically, the first transmitting module 601 selects the plurality of cells from the cells within the predetermined distance from the terminal device based on one or more of the following manners:

selecting the plurality of cells from the cells within the predetermined distance from the terminal device based on radio resource management RRM reports of the cells within the predetermined distance from the terminal device;

selecting the plurality of cells from the cells within the predetermined distance from the terminal device based on pre-estimation of a location of the terminal device; and selecting the plurality of cells from the cells within the predetermined distance from the terminal device based on times of arrival TOA of PRSs transmitted in the cells within the predetermined distance from the terminal device.

Optionally, the first target configuration information includes a generation parameter of the PRS, and the network device 600 may further include:

a second transmitting module, configured to, after the first target configuration information is transmitted, generate the PRS based on the generation parameter and transmit the PRS.

The generation parameter is associated with at least one of the following parameters:

a slot index in a radio frame in which the PRS is located;

an index of an orthogonal frequency division multiplexing OFDM symbol in a slot in which the PRS is located;

a cyclic prefix CP type of the PRS;

cell ID information of the PRS;

an ID of the terminal device or an ID of a user group to which the terminal device belongs; and an ID of a synchronization signal block SSB.

Optionally, the first target configuration information includes: time domain position information and frequency domain position information of an resource element RE occupied by the PRS, the frequency domain position is associated with a specified numerology of the network device, and the frequency domain position information includes start point information of the frequency domain position. The start point information is the first subcarrier on the first common resource block of the network device.

Correspondingly, the second transmitting module is configured to transmit the PRS at the time domain position and the frequency domain position that is associated with the specified numerology.

Figure 7:
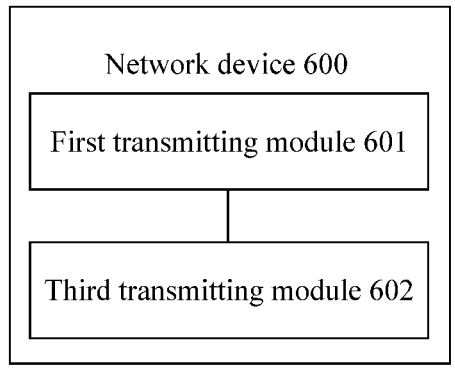
FIG. 7 is a schematic structural diagram 2 of a network device according to some embodiments of this disclosure.

Optionally, as shown in FIG. 7, the network device 600 may further include: a third transmitting module 602, configured to transmit second target configuration information, where the second target configuration information includes a synchronization signal block SSB or channel state information reference signal CSI-RS that has a quasi co-location QCL relationship with the PRS.

The SSB or the CSI-RS is used to provide the first target configuration information to the terminal device, and the first target configuration information that is provided includes at least one of time information or beam information of the PRS.

Optionally, the first target configuration information further includes at least one of the following information:

cell ID information of the PRS;

positioning performance indicator information of the terminal device;

slot configuration information for configuring the PRS by the network device;

subcarrier spacing information for configuring the PRS by the network device;

bandwidth information configured for the terminal device by the network device;

cyclic prefix CP information of the PRS;

port information for configuring the PRS by the network device; and power gain information of the PRS.

Optionally, the first target configuration information is configured based on a bandwidth part BWP; or the first target configuration information is configured based on a cell.

Optionally, the first target configuration information further includes: resource multiplexing information of the PRS and a second preset signal.

The second preset signal includes at least one of a synchronization signal block SSB, a channel state information reference signal CSI-RS, a physical downlink control channel PDCCH, a physical downlink shared channel PDSCH, a tracking reference signal TRS, a phase tracking reference signal PTRS, or a demodulation reference signal DMRS.

Optionally, the first transmitting module transmits the first target configuration information in at least one of the following manners: transmitting the first target configuration information based on higher-layer signaling; transmitting the first target configuration information based on MAC-layer signaling; or transmitting the first target configuration information based on downlink control information DCI.

Figure 8:
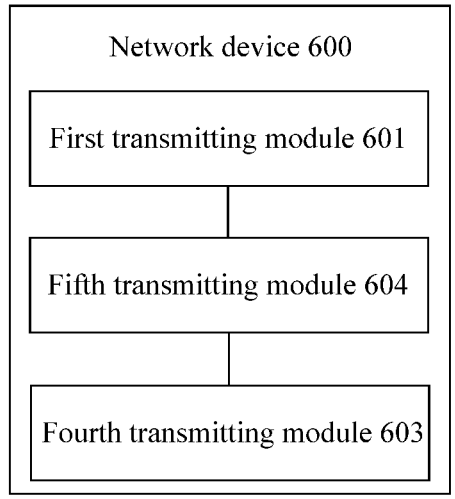
FIG. 8 is a schematic structural diagram 3 of a network device according to some embodiments of this disclosure.

Optionally, as shown in FIG. 8, the network device 600 may further include: a fourth transmitting module 603, configured to transmit one or more PRS resource sets, and the PRS resource set consists of at least one PRS resource mapped onto at least one resource element.

Optionally, the network device 600 may further include: a fifth transmitting module 604, configured to transmit third target configuration information before the one or more PRS resource sets are transmitted, where the third target configuration information is used to configure a PRS in the PRS resource set.

The third target configuration information includes one or more of the following information:

a resource configuration identifier corresponding to the PRS in the PRS resource set;

period information and slot information of the PRS in the PRS resource set;

mapping information between the PRS in the PRS resource set and a resource of the network device;

power control information of the PRS in the PRS resource set;

a generation parameter for generating the PRS in the PRS resource set;

bandwidth part BWP information of the PRS in the PRS resource set; and

QCL information of the PRS in the PRS resource set.

Optionally, the fifth transmitting module 604 may transmit the third target configuration information in at least one of the following manners: transmitting the third target configuration information based on higher-layer signaling; transmitting the third target configuration information based on MAC-layer signaling; transmitting the third target configuration information based on downlink control information DCI; and transmitting the third target configuration information based on the positioning protocol (LPP) between user equipment (UE) and a location server.

The network devices shown in FIG. 6 to FIG. 8 may be used to implement various embodiments of the method for configuring a positioning reference signal in the NR system shown in FIG. 1 to FIG. 3. For related details, refer to the foregoing method embodiments.

Figure 9:
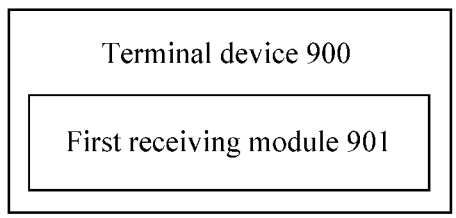
FIG. 9 is a schematic structural diagram 1 of a terminal device according to some embodiments of this disclosure.

As shown in FIG. 9, some embodiments of this disclosure further provide a terminal device 900. The terminal device 900 may include a first receiving module 901, configured to receive first target configuration information, where the first target configuration information is used to configure a positioning reference signal PRS of the terminal device.

The terminal device 900 provided in the embodiment shown in FIG. 9 can receive the first target configuration information for configuring the positioning reference signal PRS of the terminal device, and therefore can obtain the PRS.

The following describes a manner of receiving the first target configuration information and content contained in the first target configuration information with reference to specific embodiments.

Optionally, the first target configuration information is configured by a network device for the terminal device through one cell in a plurality of cells, where the plurality of cells are selected and determined by the network device from cells within a predetermined distance from the terminal device.

Further, the first receiving module 901 selects the plurality of cells from the cells within the predetermined distance from the terminal device based on one or more of the following manners:

selecting the plurality of cells from the cells within the predetermined distance from the terminal device based on radio resource management RRM reports of the cells within the predetermined distance from the terminal device;

selecting the plurality of cells from the cells within the predetermined distance from the terminal device based on pre-estimation of a location of the terminal device; and selecting the plurality of cells from the cells within the predetermined distance from the terminal device based on times of arrival TOA of PRSs transmitted in the cells within the predetermined distance from the terminal device.

Optionally, the first target configuration information includes a generation parameter of the PRS, and the terminal device 900 may further include:

a second receiving module, configured to receive the PRS after the first target configuration information is received, where the PRS is generated based on the generation parameter.

The generation parameter is associated with at least one of the following parameters:

a slot index in a radio frame in which the PRS is located;

an index of an orthogonal frequency division multiplexing OFDM symbol in a slot in which the PRS is located;

a cyclic prefix CP type of the PRS;

cell ID information of the PRS;

an ID of the terminal device or an ID of a user group to which the terminal device belongs; and an ID of a synchronization signal block SSB.

Optionally, the first target configuration information includes: time domain position information and frequency domain position information of an resource element RE occupied by the PRS, the frequency domain position is associated with a specified numerology of the network device, and the frequency domain position information includes start point information of the frequency domain position. The start point information is the first subcarrier on the first common resource block of the network device.

Correspondingly, the second receiving module receives the PRS at the time domain position and the frequency domain position that is associated with the specified numerology.

Optionally, the terminal device 900 may further include: a third receiving module, configured to receive second target configuration information, where the second target configuration information includes a synchronization signal block SSB or channel state information reference signal CSI-RS that has a quasi co-location QCL relationship with the PRS.

The SSB or the CSI-RS is used to provide the first target configuration information to the terminal device, and the first target configuration information that is provided includes at least one of time information or beam information of the PRS.

Optionally, the first target configuration information further includes at least one of the following information:

cell ID information of the PRS;

positioning performance indicator information of the terminal device;

slot configuration information for configuring the PRS by the network device;

subcarrier spacing information for configuring the PRS by the network device;

bandwidth information configured for the terminal device by the network device;

cyclic prefix CP information of the PRS;

port information for configuring the PRS by the network device; and power gain information of the PRS.

Optionally, the first target configuration information is configured based on a bandwidth part BWP; or the first target configuration information is configured based on a cell.

Optionally, the first target configuration information further includes: resource multiplexing information of the PRS and a second preset signal.

The second preset signal includes at least one of a synchronization signal block SSB, a channel state information reference signal CSI-RS, a physical downlink control channel PDCCH, a physical downlink shared channel PDSCH, a tracking reference signal TRS, a phase tracking reference signal PTRS, or a demodulation reference signal DMRS.

Optionally, the first receiving module receives the first target configuration information in at least one of the following manners: receiving the first target configuration information based on higher-layer signaling; receiving the first target configuration information based on MAC-layer signaling; or receiving the first target configuration information based on downlink control information DCI.

Optionally, the terminal device 900 may further include: a fourth receiving module, configured to receive one or more PRS resource sets, and the PRS resource set consists of at least one PRS resource mapped onto at least one resource element.

Optionally, the terminal device 900 may further include: a fifth receiving module, configured to receive third target configuration information before the one or more PRS resource sets are received, where the third target configuration information is used to configure a PRS in the PRS resource set.

The third target configuration information includes one or more of the following information:

a resource configuration identifier corresponding to the PRS in the PRS resource set;

period information and slot information of the PRS in the PRS resource set;

mapping information between the PRS in the PRS resource set and a resource of the network device;

power control information of the PRS in the PRS resource set;

a generation parameter for generating the PRS in the PRS resource set;

bandwidth part BWP information of the PRS in the PRS resource set; and

QCL information of the PRS in the PRS resource set.

Optionally, the fifth receiving module may receive the third target configuration information in at least one of the following manners: receiving the third target configuration information based on higher-layer signaling (for example, RRC); receiving the third target configuration information based on MAC-layer signaling; receiving the third target configuration information based on downlink control information DCI; and receiving the third target configuration information based on the positioning protocol LPP (LTE positioning protocol) between UE and a location server.

Figure 10:
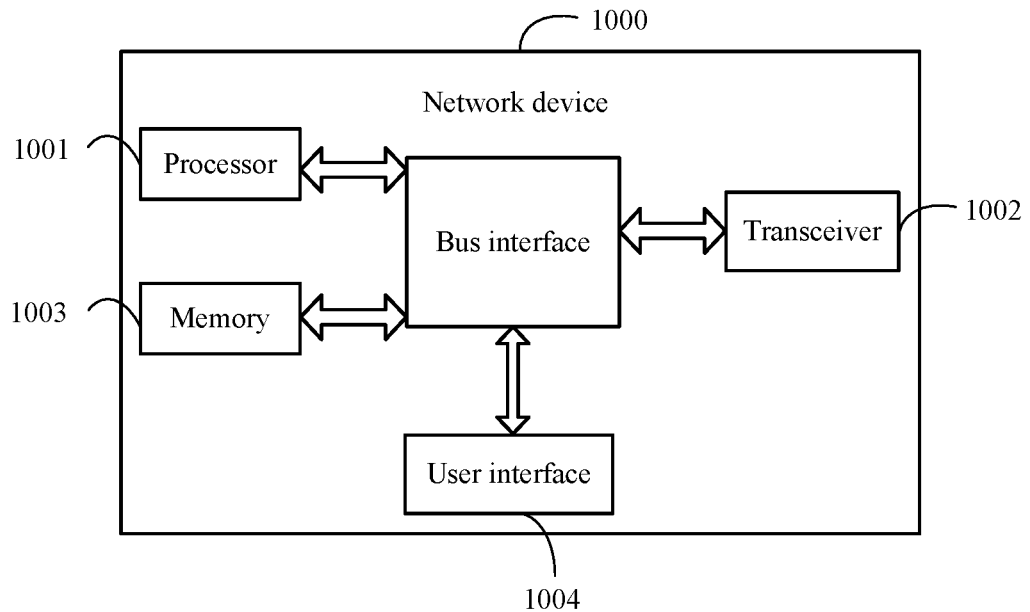
FIG. 10 is a schematic structural diagram of a network device according to some embodiments of this disclosure.

Referring to FIG. 10, FIG. 10 is a structural diagram of a network device to which an embodiment of this disclosure is applied. The network device is capable of implementing details of the foregoing method for configuring a positioning reference signal in the NR system, with the same effects achieved. As shown in FIG. 10, the network device 1000 includes a processor 1001, a transceiver 1002, a memory 1003, a user interface 1004, and a bus interface.

In some embodiments of this disclosure, the network device 1000 further includes: a computer program stored in the memory 1003 and capable of running on the processor 1001. When the computer program is executed by the processor 1001, the processes of the foregoing method for configuring a positioning reference signal in the NR system are implemented, with the same technical effects achieved. To avoid repetition, details are not described herein again.

In FIG. 10, a bus architecture may include any quantity of interconnected buses and bridges, and specifically connects together circuits that are of at least one processor represented by the processor 1001 and of a memory represented by the memory 1003. The bus architecture may further connect together various other circuits such as a peripheral device, a voltage stabilizer, and a power management circuit. These are well known in the art, and therefore are not further described in this specification any more. A bus interface provides interfaces. The transceiver 1002 may be a plurality of components, including a transmitter and a receiver, and provides units for communicating with a variety of other apparatuses on a transmission medium. For different terminal devices, the user interface 1004 may also be an interface that can be externally or internally connected to a required device. The connected device includes but is not limited to a keypad, a display, a speaker, a microphone, a joystick, and the like.

The processor 1001 is responsible for management of the bus architecture and general processing, and the memory 1003 is capable of storing data that is used by the processor 1001 during operation.

Figure 11:
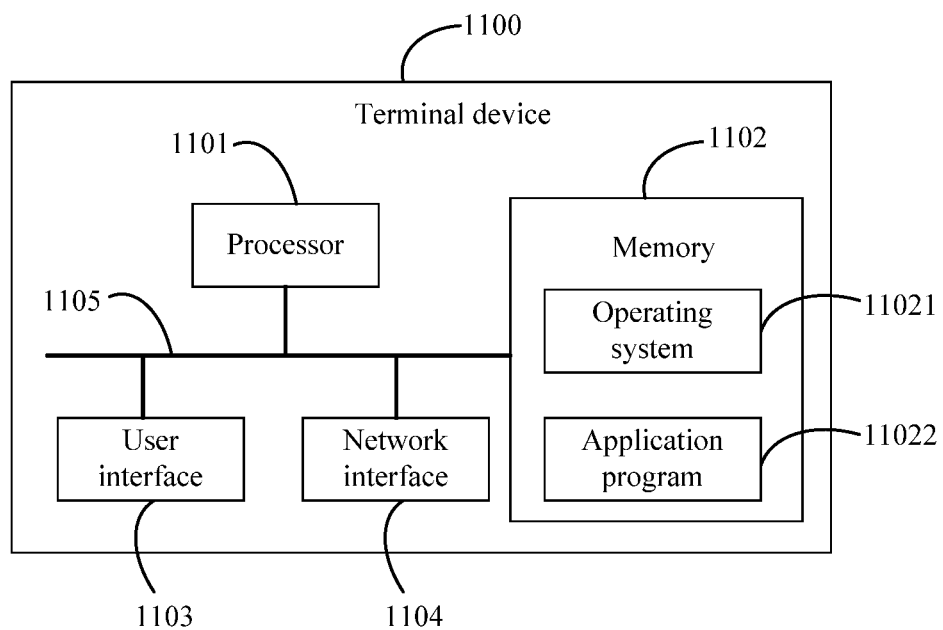
FIG. 11 is a schematic structural diagram of a terminal device according to some embodiments of this disclosure.

FIG. 11 is a schematic structural diagram of a terminal device according to another embodiment of this disclosure. The terminal device 1100 shown in FIG. 11 includes at least one processor 1101, a memory 1102, at least one network interface 1104, and a user interface 1103. The components of the terminal device 1100 are coupled together by using the bus system 1105. It can be understood that the bus system 1105 is configured to implement connection communication between these components. The bus system 1105 may include not only a data bus but also a power supply bus, a control bus, and a status signal bus. However, for clear description, various buses in FIG. 11 are marked as the bus system 1105.

The user interface 1103 may include a display, a keyboard, a click device (for example, a mouse or a trackball), a touch board, or a touchscreen.

It may be understood that the memory 1102 in some embodiments of this disclosure may be a volatile memory or a non-volatile memory, or may include both a volatile memory and a non-volatile memory. The non-volatile memory may be a read-only memory (ROM), a programmable read only memory (PROM), an erasable programmable read-only memory (EPROM), and an electrically erasable programmable read-only memory (EEPROM), or a flash memory. The volatile memory may be a random access memory (RAM), and the RAM is used as an external cache. For illustrative rather than restrictive description, many forms of RAMs are available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct memory bus random access memory (DRRAM). The memory 1102 in a system and the method that are described in some embodiments of this disclosure is intended to include but is not limited to these memories and any other appropriate types of memories.

In some implementations, the memory 1102 stores the following elements: an executable module or a data structure, or a subset thereof, or an extended set thereof: an operating system 11021 and an application program 11022.

The operating system 11021 includes various system programs, such as a framework layer, a kernel library layer, and a driver layer, and is configured to implement various basic services and process hardware-based tasks. The application program 11022 includes various application programs, such as a media player and a browser, and is configured to implement various application services. A program that implements the methods of some embodiments of this disclosure may be included in the application program 11022.

In some embodiments of this disclosure, the terminal device 1100 further includes: a computer program stored in the memory 1102 and capable of running on the processor 1101. When the computer program is executed by the processor 1101, the processes of the foregoing method for configuring a positioning reference signal in the NR system are implemented, with the same technical effects achieved. To avoid repetition, details are not described herein again.

The foregoing methods disclosed by some embodiments of this disclosure may be applied to the processor 1101, or be implemented by the processor 1101. The processor 1101 may be an integrated circuit chip with a signal processing capability. In an implementation process, the steps of the methods may be implemented by an integrated logical circuit of hardware in the processor 1101, or by a software instruction. The processor 1101 may be a general purpose processor, a digital signal processor (DSP), an application-specific integrated circuit (ASIC), a field programmable gate array (Field Programmable Gate Array, FPGA) or another programmable logic device, a discrete gate or transistor logic device, or a discrete hardware component. The processor may implement or perform the methods, steps, and logical block diagrams that are disclosed in some embodiments of this disclosure. The general-purpose processor may be a microprocessor, or the processor may be any conventional processor or the like. Steps of the methods disclosed with reference to some embodiments of this disclosure may be directly performed and completed by using a hardware decoding processor, or may be performed and completed by using a combination of hardware and a software module in a decoding processor. The software module may be located in a mature computer-readable storage medium in the art, such as a random access memory, a flash memory, a read-only memory, a programmable read-only memory, an electrically erasable programmable memory, or a register. The computer-readable storage medium is located in the memory 1102, and the processor 1101 reads information from the memory 1102 and performs the steps in the foregoing methods in combination with hardware of the processor. Specifically, the computer-readable storage medium stores a computer program. When the computer program is executed by the processor 1101, the steps of the foregoing embodiment of the method for configuring a positioning reference signal in the NR system are implemented.

It can be understood that the embodiments described in some embodiments of this disclosure may be implemented by hardware, software, firmware, middleware, microcode, or a combination thereof. For hardware implementation, processing units can be implemented in at least one application specific integrated circuit (ASIC), digital signal processor (DSP), digital signal processing device (DSPD), programmable logic device (PLD), field-programmable gate array (FPGA), general-purpose processor, microcontroller, microprocessor, other electronic units for performing the functions described in this disclosure, or a combination thereof.

For software implementation, the techniques described in some embodiments of this disclosure may be implemented by modules (such as processes and functions) that perform the functions described in some embodiments of this disclosure. Software code may be stored in the memory and executed by the processor. The memory may be implemented in or outside the processor.

Some embodiments of this disclosure further provide a computer readable storage medium, where a computer program is stored in the computer readable storage medium. When the computer program is executed by a processor, the processes of the foregoing embodiment of the method for configuring a positioning reference signal in the NR system can be implemented, with the same technical effects achieved. To avoid repetition, details are not described herein again. The computer readable storage medium is, for example, a read-only memory (ROM), a random access memory (RAM), a magnetic disk, or an optical disc.

Some embodiments of this disclosure further provide a computer program product including instructions. When the computer runs the instructions of the computer program product, the computer executes the method for configuring a positioning reference signal in the NR system or the method for receiving a positioning reference signal in the NR system. Specifically, the computer program product can be run on the foregoing network device.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this disclosure, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this disclosure may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this disclosure essentially, or the part contributing to the related art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A method for receiving a positioning reference signal in a new radio (NR) system, operated by a terminal device, wherein the method comprises:
    receiving target configuration information from a positioning server, wherein the target configuration information is used to configure one or more positioning reference signals (PRSs) in a PRS resource set;
    receiving one or more PRS resource sets,
    wherein the PRS resource set consists of at least one PRS resource, and the target configuration information comprises quasi co-location (QCL) information of the at least one PRS resource, and each of the at least one PRS resource has respective QCL information;
    wherein the method further comprises:
    receiving first target configuration information, wherein the first target configuration information is used to configure a PRS of the terminal device;
    the first target configuration information comprises at least one of the following information:
    cell ID information of the PRS;
    positioning performance indicator information of the terminal device;
    slot configuration information for configuring the PRS by the network device;
    subcarrier spacing information for configuring the PRS by the network device;
    bandwidth information configured for the terminal device by the network device;

cyclic prefix (CP) information of the PRS;
port information for configuring the PRS by the network device; and
power gain information of the PRS.
wherein PRSs received by the terminal device from a plurality of cells participating in positioning have a same subcarrier spacing and a same CP type;
wherein the method further comprises: receiving the PRS in $N_{PRS}$ consecutive downlink slots, wherein a first one of the $N_{PRS}$ consecutive downlink slots satisfies the following formula:

$$(N_{slot}^{frame,\mu} \times n_f + n_s - \Delta_{PRS}) \mod T_{PRS} = 0, \text{ wherein } N_{slot}^{frame,\mu}$$

is a quantity of slots comprised in a radio frame corresponding to a numerology, $n_f$ is a radio frame index, $n_s$ is a slot index in a radio frame, $\Delta_{PRS}$ is a slot offset of the PRS signal, and $T_{PRS}$ is a transmission period of the PRS signal.

2. The method according to claim 1, wherein
the first target configuration information is configured by a network device for the terminal device through one cell in a plurality of cells, wherein the plurality of cells are selected and determined by the network device from cells within a predetermined distance from the terminal device, wherein
the plurality of cells are selected from the cells within the predetermined distance from the terminal device based on one or more of the following manners:
selecting the plurality of cells from the cells within the predetermined distance from the terminal device based on radio resource management RRM reports of the cells within the predetermined distance from the terminal device;
selecting the plurality of cells from the cells within the predetermined distance from the terminal device based on pre-estimation of a location of the terminal device; and
selecting the plurality of cells from the cells within the predetermined distance from the terminal device based on times of arrival (TOA) of PRSs transmitted in the cells within the predetermined distance from the terminal device.

3. The method according to claim 1, wherein
the first target configuration information further comprises a generation parameter of the PRS, and after the receiving the first target configuration information, the method further comprises:
receiving the PRS, wherein the PRS is generated based on the generation parameter; wherein
the generation parameter is associated with at least one of the following parameters:
a slot index in a radio frame in which the PRS is located;
an index of an orthogonal frequency division multiplexing (OFDM) symbol in a slot in which the PRS is located;
a cyclic prefix (CP) type of the PRS;
cell ID information of the PRS;
an ID of the terminal device or an ID of a user group to which the terminal device belongs; and
an ID of a synchronization signal block (SSB).

4. The method according to claim 1, wherein the method further comprises:
receiving second target configuration information, wherein the second target configuration information comprises a synchronization signal block (SSB) or channel state information reference signal (CSI-RS) that has a quasi co-location (QCL) relationship with the PRS, wherein
the SSB or the CSI-RS is used to provide the first target configuration information to the terminal device, and the first target configuration information that is provided comprises at least one of time information or beam information of the PRS.

5. The method according to claim 1, wherein
the first target configuration information is received in at least one of the following manners:
receiving the first target configuration information based on higher-layer signaling;
receiving the first target configuration information based on media access control (MAC) layer signaling; or
receiving the first target configuration information based on downlink control information (DCI).

6. The method according to claim 1, wherein the at least one PRS resource in the PRS set is mapped onto at least one resource element.

7. The method according to claim 1, wherein
the target configuration information further comprises one or more of the following information:
a resource configuration identifier corresponding to the PRS in the PRS resource set;
period information and slot information of the PRS in the PRS resource set;
mapping information between the PRS in the PRS resource set and a resource of the network device;
power control information of the PRS in the PRS resource set;
a generation parameter for generating the PRS in the PRS resource set;
bandwidth part (BWP) information of the PRS in the PRS resource set.

8. The method according to claim 1, wherein
the target configuration information is received in at least one of the following manners:
receiving the target configuration information based on higher-layer signaling;
receiving the target configuration information based on MAC-layer signaling;
receiving the target configuration information based on downlink control information (DCI).
receiving the target configuration information based on the positioning protocol (LPP) between the terminal device and a location server.

9. A terminal device, comprising a memory, a processor, and a wireless communication program stored in the memory and capable of running on the processor, wherein when the wireless communication program is executed by the processor, the terminal device implements a following step of:
receiving target configuration information from a positioning server, wherein the target configuration information is used to configure one or more positioning reference signals (PRSs) in a PRS set;
receiving one or more PRS resource sets,
wherein the PRS resource set consists of at least one PRS resource, and the target configuration information comprises quasi co-location (QCL) information of the at least one PRS resource, and each of the at least one PRS resource has respective QCL information;

wherein when the wireless communication program is executed by the processor, the terminal device further implements a following step of:

receiving first target configuration information, wherein the first target configuration information is used to configure a PRS of the terminal device;

the first target configuration information comprises at least one of the following information:

cell ID information of the PRS;

positioning performance indicator information of the terminal device;

slot configuration information for configuring the PRS by the network device;

subcarrier spacing information for configuring the PRS by the network device;

bandwidth information configured for the terminal device by the network device;

cyclic prefix (CP) information of the PRS;

port information for configuring the PRS by the network device; and power gain information of the PRS, wherein PRSs received by the terminal device from a plurality of cells participating in positioning have a same subcarrier spacing and a same CP type, wherein when the wireless communication program is executed by the processor, the terminal device further implements a step of:

receiving the PRS in $N_{PRS}$ consecutive downlink slots, wherein a first one of the $N_{PRS}$ consecutive downlink slots satisfies the following formula:

$$(N_{slot}^{frame,\mu} \times n_f + n_s - \Delta_{PRS}) \bmod T_{PRS} = 0, \text{ wherein } N_{slot}^{frame,\mu}$$

is a quantity of slots comprised in a radio frame corresponding to a numerology, $n_f$ is a radio frame index, $n_s$ is a slot index in a radio frame, $\Delta_{PRS}$ is a slot offset of the PRS signal, and $T_{PRS}$ is a transmission period of the PRS signal.

10. The terminal device according to claim 9, wherein the first target configuration information is configured by a network device for the terminal device through one cell in a plurality of cells, wherein the plurality of cells are selected and determined by the network device from cells within a predetermined distance from the terminal device, wherein the plurality of cells are selected from the cells within the predetermined distance from the terminal device based on one or more of the following manners:

selecting the plurality of cells from the cells within the predetermined distance from the terminal device based on radio resource management RRM reports of the cells within the predetermined distance from the terminal device;

selecting the plurality of cells from the cells within the predetermined distance from the terminal device based on pre-estimation of a location of the terminal device; and selecting the plurality of cells from the cells within the predetermined distance from the terminal device based on times of arrival (TOA) of PRSs transmitted in the cells within the predetermined distance from the terminal device.

11. The terminal device according to claim 9, wherein the first target configuration information further comprises a generation parameter of the PRS, and when the wireless communication program is executed by the processor, the terminal device further implements a step of: after the receiving the first target configuration information, receiving the PRS, wherein the PRS is generated based on the generation parameter; wherein the generation parameter is associated with at least one of the following parameters:

a slot index in a radio frame in which the PRS is located;

an index of an orthogonal frequency division multiplexing (OFDM) symbol in a slot in which the PRS is located;

a cyclic prefix (CP) type of the PRS;

cell ID information of the PRS;

an ID of the terminal device or an ID of a user group to which the terminal device belongs; and an ID of a synchronization signal block SSB.

12. The terminal device according to claim 9, wherein when the wireless communication program is executed by the processor, the terminal device further implements a following step of:

receiving second target configuration information, wherein the second target configuration information comprises a synchronization signal block (SSB) or channel state information reference signal (CSI-RS) that has a quasi co-location (QCL) relationship with the PRS, wherein the SSB or the CSI-RS is used to provide the first target configuration information to the terminal device, and the first target configuration information that is provided comprises at least one of time information or beam information of the PRS.

13. The terminal device according to claim 9, wherein the first target configuration information is received in at least one of the following manners:

receiving the first target configuration information based on higher-layer signaling;

receiving the first target configuration information based on media access control (MAC)-layer signaling; or receiving the first target configuration information based on downlink control information (DCI).

14. The terminal device according to claim 9, wherein the at least one PRS resource in the PRS set is mapped onto at least one resource element.

15. The terminal device according to claim 14, wherein the target configuration information further comprises one or more of the following information:

a resource configuration identifier corresponding to the PRS in the PRS resource set;

period information and slot information of the PRS in the PRS resource set;

mapping information between the PRS in the PRS resource set and a resource of the network device;

power control information of the PRS in the PRS resource set;

a generation parameter for generating the PRS in the PRS resource set;

bandwidth part (BWP) information of the PRS in the PRS resource set.

16. A computer-readable medium, wherein the computer-readable medium stores a wireless communication program, and when the wireless communication program is executed by a processor, the processor implements a following step of:

receiving target configuration information from a positioning server, wherein the target configuration information is used to configure one or more positioning reference signals (PRSs) in a PRS set;

receiving one or more PRS resource sets, wherein the PRS resource set consists of at least one PRS resource, and the target configuration information comprises quasi co-location (QCL) information of the at least one PRS resource, and each of the at least one PRS resource has respective QCL information;

wherein when the wireless communication program is executed by the processor, the processor further implements a following step of:

receiving first target configuration information, wherein the first target configuration information is used to configure a PRS of the terminal device;

the first target configuration information comprises at least one of the following information:

cell ID information of the PRS;

positioning performance indicator information of the terminal device;

slot configuration information for configuring the PRS by the network device;

subcarrier spacing information for configuring the PRS by the network device;

bandwidth information configured for the terminal device by the network device;

cyclic prefix (CP) information of the PRS;

port information for configuring the PRS by the network device; and power gain information of the PRS, wherein PRSs received by the terminal device from a plurality of cells participating in positioning have a same subcarrier spacing and a same CP type, wherein when the wireless communication program is executed by the processor, the terminal device further implements a step of:

receiving the PRS in $N_{PRS}$ consecutive downlink slots, wherein a first one of the $N_{PRS}$ consecutive downlink slots satisfies the following formula:

$$(N_{slot}^{frame,\mu} \times n_f + n_s - \Delta_{PRS}) \bmod T_{PRS} = 0, \text{ wherein } N_{slot}^{frame,\mu}$$

is a quantity of slots comprised in a radio frame corresponding to a numerology, $n_f$ is a radio frame index, $n_s$ is a slot index in a radio frame, $\Delta_{PRS}$ is a slot offset of the PRS signal, and $T_{PRS}$ is a transmission period of the PRS signal.

* * * * *